(12) United States Patent
Wu et al.

(10) Patent No.: US 10,677,410 B2
(45) Date of Patent: Jun. 9, 2020

(54) LIGHT BEAM ADJUSTING DEVICE, VEHICLE LAMP AND MOTOR VEHICLE

(71) Applicant: Valeo Lighting Hubei Technical Center Co, Ltd., Wuhan (CN)

(72) Inventors: Sihua Wu, Wuhan (CN); Bing Zhang, Wuhan (CN)

(73) Assignee: Valeo Lighting Hubei Technical Center Co. Ltd., Wuhan (CN)

( * ) Notice: Subject to any disclaimer, the term of this patent is extended or adjusted under 35 U.S.C. 154(b) by 0 days.

(21) Appl. No.: 16/130,508

(22) Filed: Sep. 13, 2018

(65) Prior Publication Data
US 2019/0078747 A1  Mar. 14, 2019

(30) Foreign Application Priority Data
Sep. 14, 2017  (CN) .......................... 2017 1 0840365

(51) Int. Cl.
*F21S 41/00* (2018.01)
*F21S 41/43* (2018.01)
*F21S 41/24* (2018.01)
*F21S 43/249* (2018.01)
*F21V 8/00* (2006.01)
*F21S 43/239* (2018.01)
*F21S 43/243* (2018.01)
*B60Q 1/26* (2006.01)
*F21S 43/14* (2018.01)
(Continued)

(52) U.S. Cl.
CPC ............ *F21S 41/43* (2018.01); *B60Q 1/2607* (2013.01); *F21S 41/24* (2018.01); *F21S 43/14* (2018.01); *F21S 43/239* (2018.01); *F21S 43/241* (2018.01); *F21S 43/243* (2018.01); *F21S 43/249* (2018.01); *G02B 6/002* (2013.01); *G02B 6/008* (2013.01); *G02B 6/0038* (2013.01); *G02B 6/0068* (2013.01); *G02B 27/0905* (2013.01); *B60Q 2400/20* (2013.01); *F21S 41/285* (2018.01); *F21W 2103/20* (2018.01); *F21W 2103/55* (2018.01)

(58) Field of Classification Search
CPC .......... F21S 41/24; F21S 41/43; F21S 41/249; F21S 41/14; G02B 6/0075–0078
See application file for complete search history.

(56) References Cited

U.S. PATENT DOCUMENTS

| | | | |
|---|---|---|---|
| 2009/0027588 A1* | 1/2009 | Medendorp, Jr. .... | G02B 6/0076 349/62 |
| 2011/0013411 A1* | 1/2011 | Sakiyama ............ | B60Q 1/2665 362/494 |

(Continued)

*Primary Examiner* — Gerald J Sufleta, II
(74) *Attorney, Agent, or Firm* — Oblon, McClelland, Maier & Neustadt, L.L.P.

(57) ABSTRACT

A light beam adjusting device performs a process on at least two kinds of light beams in combination. Through this light beam adjusting device, a part of a first light beam is emitted from a first light exit face and another part thereof may be emitted from a second light exit face. Similarly, a part of the second light beam is also emitted from the first light exit face, and another part thereof may be emitted from the second light exit face. In this way, regardless of whether the first light beam is turned on or the second light beam is turned on, the light adjusted by the light beam adjusting device can be simultaneously emitted from the first light exit face and the second light exit face.

20 Claims, 5 Drawing Sheets

(51) Int. Cl.
  *F21S 43/241*   (2018.01)
  *G02B 27/09*   (2006.01)
  *F21S 41/20*   (2018.01)
  *F21W 103/20*   (2018.01)
  *F21W 103/55*   (2018.01)

(56) References Cited

U.S. PATENT DOCUMENTS

| | | | |
|---|---|---|---|
| 2013/0235608 A1* | 9/2013 | Tsai | G02B 6/0008 |
| | | | 362/551 |
| 2015/0124469 A1* | 5/2015 | Krenn | F21S 41/43 |
| | | | 362/511 |
| 2015/0226395 A1* | 8/2015 | Taudt | F21S 41/24 |
| | | | 362/511 |
| 2016/0116666 A1* | 4/2016 | Sato | G02B 6/002 |
| | | | 362/509 |
| 2016/0259109 A1* | 9/2016 | Wolfing | G02B 6/0016 |
| 2016/0259116 A1* | 9/2016 | Van Bommel | G02B 6/0003 |
| 2016/0347234 A1* | 12/2016 | Herbin | F21S 43/237 |
| 2017/0219178 A1* | 8/2017 | Faffelberger | F21S 43/14 |
| 2017/0241615 A1* | 8/2017 | Luo | G02B 6/0028 |
| 2017/0336041 A1* | 11/2017 | Mochizuki | B60Q 1/0011 |
| 2018/0245759 A1* | 8/2018 | Plank | F21S 41/143 |
| 2018/0363858 A1* | 12/2018 | Peeters | G02B 6/0003 |

\* cited by examiner

LIGHT BEAM ADJUSTING DEVICE, VEHICLE LAMP AND MOTOR VEHICLE

TECHNICAL FIELD

The present disclosure relates to the field of lighting and signaling, and in particular, to a light beam adjusting device, a vehicle lamp, and a motor vehicle.

BACKGROUND

Optical lighting or signaling devices, such as vehicle lamps, are important components in motor vehicles. Traffic rules and industry standards raise specific requirements on light intensity distribution of light emitted by various vehicle lamps (such as headlights, daytime running lights, brake lights, turn indicators, and so on). Therefore, emergent light beam of the vehicle lamps needs to be adjusted by an optical system before leaving the lamps.

In conventional motor vehicles, vehicle lamps for realizing different functions tend to occupy different spaces, and light exit faces thereof are also independent of each other. Therefore, when a plurality of vehicle lamps for realizing different functions are required, it is definitely necessary to occupy larger spaces, and each individual light exit face can generally only realize a single function. Thus, light emitting areas and spaces of lights for realizing different functions are limited.

SUMMARY

An object of the present disclosure is to provide a light beam adjusting device that enables light beams from different light sources to realize different functions to share a light exit face, so that at least two light beams for realizing different functions can be emitted from a same light exit face as required.

Another object of the present disclosure is to provide a vehicle lamp including the light beam adjusting device and a motor vehicle including the light beam adjusting device or the vehicle lamp.

An embodiment of the present disclosure provides a light beam adjusting device, comprising: a first adjusting unit and a second adjusting unit arranged side by side; wherein the first adjusting unit comprises: a first incident portion arranged to receive a first light beam; a first exit portion having a first light exit face; and a first light beam adjusting portion located between the first incident portion and the first exit portion and having at least one first deflecting face and at least one second deflecting face; and wherein the second adjusting unit comprises: a second incident portion arranged to receive a second light beam; a second exit portion having a second light exit face; and a second light beam adjusting portion located between the second incident portion and the second exit portion and having at least one third deflecting face and at least one fourth deflecting face, wherein the first deflecting face is arranged to deflect a part of the first light beam towards the fourth deflecting face, and the third deflecting face is arranged to deflect a part of the second light beam towards the second deflecting face, and the fourth deflecting face is arranged to deflect the part of the first light beam deflected by the first deflecting face towards the second exit portion to cause the part of the first light beam to be emitted from the second light exit face, and the second deflecting face is arranged to deflect the part of the second light beam deflected by the third deflecting face towards first exit portion to cause the part of the second light beam to be emitted from the first light exit face.

In an embodiment, the first light beam adjusting portion comprises at least one first aperture having a first inner wall for forming the first deflecting face and a second inner wall for forming the second deflecting face; and the second light beam adjusting portion comprises at least one second aperture having a third inner wall for forming the third deflecting face and a fourth inner wall for forming the fourth deflecting face.

In an embodiment, the first inner wall is located on a side of the first aperture facing towards the first incident portion, the second inner wall is located on a side of the first aperture facing towards the first exit portion, the third inner wall is located on a side of the second aperture facing towards the second incident portion, the fourth inner wall is located on a side of the second aperture facing towards the second exit portion.

In an embodiment, the first deflecting face and the fourth deflecting face are arranged to face towards each other and the second deflecting face and the third deflecting face are arranged to face towards each other.

In an embodiment, the first aperture and the second aperture are through apertures.

In an embodiment, the first aperture and the second aperture have cross sections in a shape of a right triangle.

In an embodiment, the first light beam adjusting portion has a plurality of the first deflecting faces separated from each other and a first light beam passage along which another part of the first light beam incident from the first incident portion travels towards the first exit portion is provided between the plurality of the first deflecting faces separated from each other; and the second light beam adjusting portion has a plurality of the third deflecting faces separated from each other and a second light beam passage along which another part of the second light beam incident from the second incident portion travels towards the second exit portion is provided between the plurality of the third deflecting faces separated from each other.

In an embodiment, the first exit portion is arranged opposite to the first incident portion and further comprises a first reflective face, which is located between the first light beam adjusting portion and the first light exit face and is arranged to reflect the part of the second light beam deflected by the second deflecting face and the another part of the first light beam from the first incident portion towards the first light exit face; and wherein the second exit portion is arranged opposite to the second incident portion and further comprises a second reflective face, which is located between the second light beam adjusting portion and the second light exit face and is arranged to reflect the part of the first light beam deflected by the fourth deflecting face and the another part of the second light beam from the second incident portion towards the second light exit face.

In an embodiment, the light beam adjusting device is a single piece.

In an embodiment, all of the first deflecting face, the second deflecting face, the third deflecting face and the fourth deflecting face are total reflection faces.

In an embodiment, the first incident portion is provided with a first collimator arranged to collimate the first light beam and the second incident portion is provided with a second collimator arranged to collimate the second light beam.

In an embodiment, the first light exit face and/or the second light exit face are/is provided with a plurality of light distribution protrusions, wherein the light distribution protrusions are arranged to converge or disperse parts of the light beam passing through the light distribution protrusions along a predetermined direction to adjust an intensity distribution of the light beam exiting from the first light exit face and/or the second light exit face.

In an embodiment, the first deflecting face and the second deflecting face are perpendicular to each other and the third deflecting face and the fourth deflecting face are perpendicular to each other.

In an embodiment, the light beam adjusting device comprises a plurality of the first adjusting units and a plurality of the second adjusting units arranged side by side to alternate with each other.

An embodiment of the present disclosure also provides a vehicle lamp comprising: at least one first light source arranged to emit a first light beam; at least one second light source arranged to emit a second light beam; and the light beam adjusting device as described in any one of the above embodiments.

In an embodiment, one of the first light beam and the second light beam is used for a daylight running light and the other is used for a turn indicator.

In an embodiment, one of the first light source and the second light source comprises a light emitting diode with a first color and the other comprises a light emitting diode with a second color different from the first color.

An embodiment of the present disclosure also provides a vehicle lamp comprising: only one of a first light source arranged to emit a first light beam and a second light source arranged to emit a second light beam; and the light beam adjusting device as described in any one of the above embodiments.

An embodiment of the present disclosure also provides a motor vehicle comprising the light beam adjusting device as described in any one of the above embodiments or the vehicle lamp as described in any one of the above embodiments. The light beam adjusting device according to at least one of the above embodiments of the present disclosure can provide a light exit face shared by at least two light beams such that the light beams emitted from the same light exit face can realize different light functions.

DETAILED DESCRIPTION OF EMBODIMENTS

The technical solutions of the disclosure will be further explained in detail by way of examples, with reference to the accompanying drawings. In the specification, like or similar reference numbers indicate like or similar parts. The following description of embodiments of the present disclosure with reference to the accompanying drawings is intended to explain the general inventive concept of the present disclosure and should not be construed as limiting the present disclosure.

According to a general inventive concept of the present disclosure, it provides a light beam adjusting device including a first adjusting unit and a second adjusting unit. The first adjusting unit includes: a first incident portion arranged to receive a first light beam; a first exit portion having a first light exit face; and a first light beam adjusting portion located between the first incident portion and the first exit portion and having at least one first deflecting face and at least one second deflecting face; and wherein the second adjusting unit includes: a second incident portion arranged to receive a second light beam; a second exit portion having a second light exit face; and a second light beam adjusting portion located between the second incident portion and the second exit portion and having at least one third deflecting face and at least one fourth deflecting face. The first deflecting face is arranged to deflect a part of the first light beam towards the fourth deflecting face, and the third deflecting face is arranged to deflect a part of the second light beam towards the second deflecting face, and the fourth deflecting face is arranged to deflect the part of the first light beam deflected by the first deflecting face towards the second exit portion to cause the part of the first light beam to be emitted from the second light exit face, and the second deflecting face is arranged to deflect the part of the second light beam deflected by the third deflecting face towards first exit portion to cause the part of the second light beam to be emitted from the first light exit face.

Further, in the following detailed description, numerous specific details are set forth in order to provide a thorough understanding of the embodiments of the present disclosure. It will be apparent, however, that one or more embodiments may also be practiced without these specific details.

Figure 1:
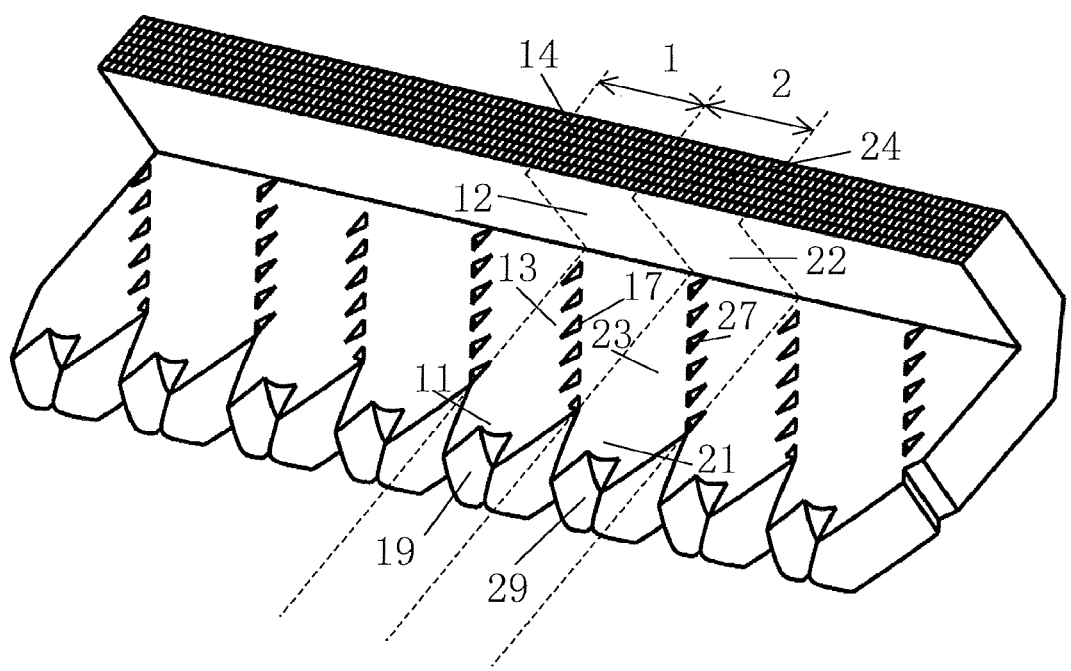
FIG. 1 is a schematic perspective view of a light beam adjusting device according to an embodiment of the present disclosure.
Figure 2:
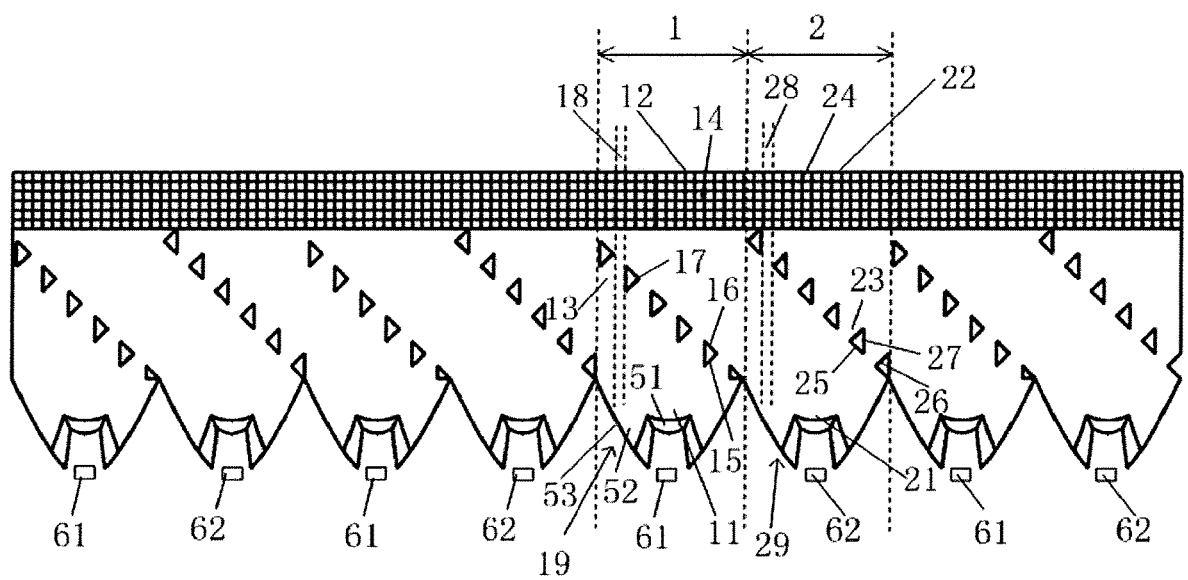
FIG. 2 is a front view of a light beam adjusting device according to an embodiment of the present disclosure.
Figure 3:
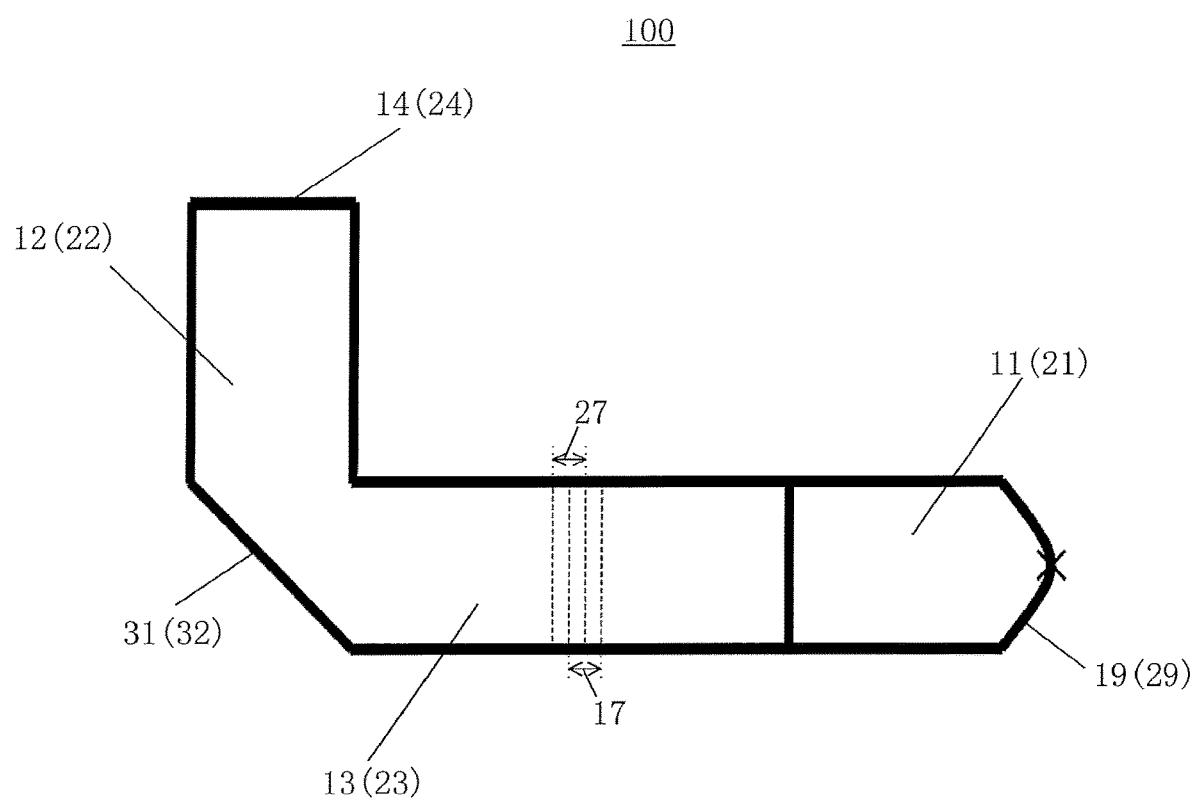
FIG. 3 is a side view of a light beam adjusting device according to an embodiment of the present disclosure.
Figure 4:
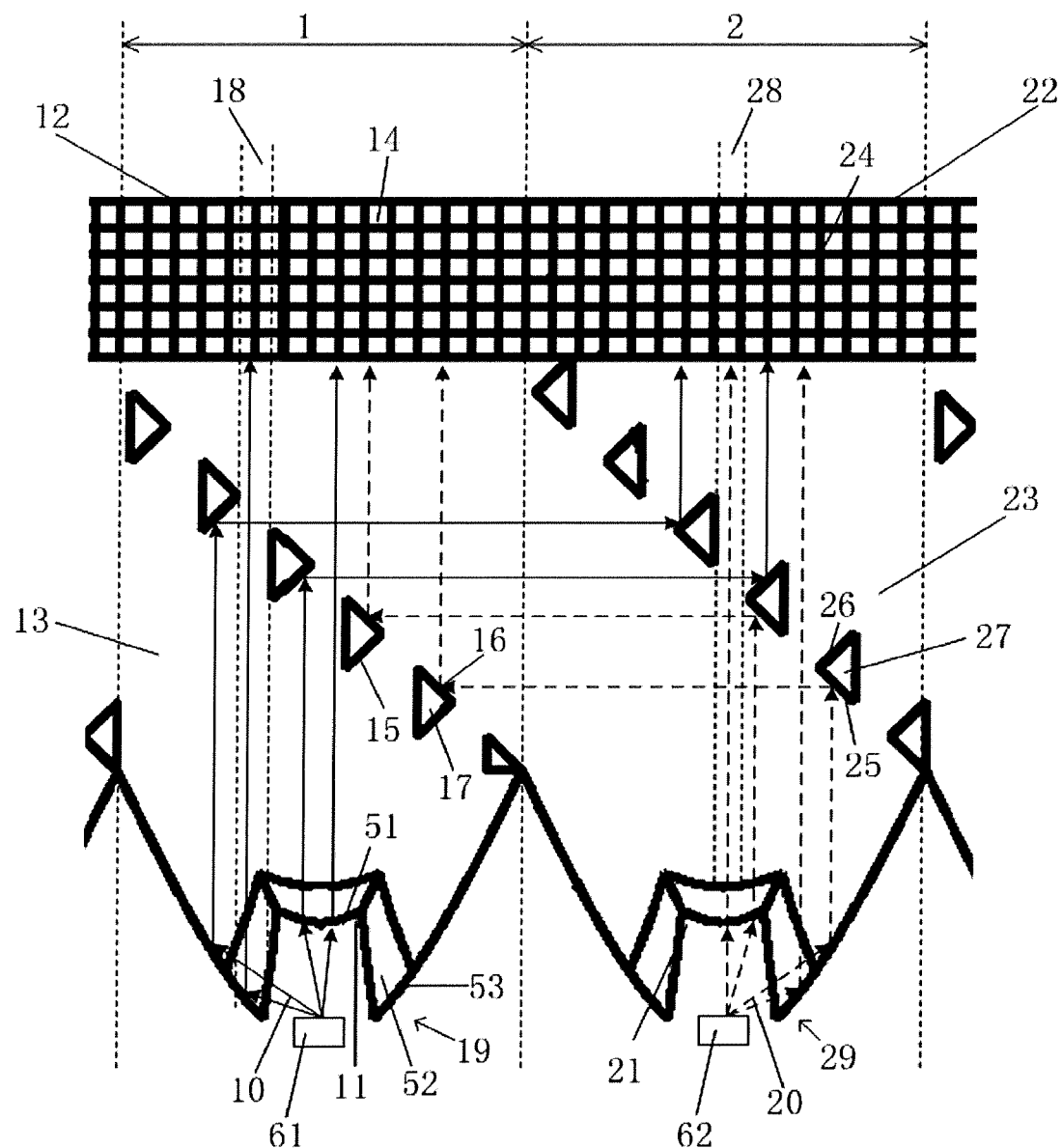
FIG. 4 is a schematic view of an optical path in a light beam adjusting device according to an embodiment of the present disclosure.

FIGS. 1 to 3 schematically show a light beam adjusting device 100 according to an embodiment of the present disclosure. The light beam adjusting device 100 includes a first adjusting unit 1 and a second adjusting unit 2. The first adjusting unit 1 includes a first incident portion 11, a first exit portion 12, and a first light beam adjusting portion 13. The second adjusting unit 2 includes a second incident portion 21, a second exit portion 22, and a second light beam adjusting portion 23. The first incident portion 11 is arranged to receive a first light beam 10. The first exit portion 12 is provided with a first light exit face 14. Similarly, the second incident portion 21 is arranged to receive a second light beam 20. The second exit portion 22 is provided with a second light exit face 24. The first light beam adjusting portion 13 is located between the first incident portion 11 and the first exit portion 12 and has at least one first deflecting face 15 and at least one second deflecting face 16. The second light beam adjusting portion 23 is located between the second incident portion 21 and the second exit portion 22 and has at least one third deflecting face 25 and at least one fourth deflecting face 26. The first deflecting face 15 is arranged to deflect a part of the first light beam 10 towards the fourth deflecting face 26, and the third deflecting face 25 is arranged to deflect a part of the second light beam 20 towards the second deflecting face 16, and the fourth deflecting face 26 is arranged to deflect the part of the first light beam 10 deflected by the first deflecting face 15 towards the second exit portion 22 to cause the part of the first light beam 10 to be emitted from the second light exit face 24, and the second deflecting face 16 is arranged to deflect the part of the second light beam 20 deflected by the third deflecting face 25 towards first exit portion 12 to cause the part of the second light beam 20 to be emitted from the first light exit face 14. The action of the first deflecting face 15, the second deflecting face 16, the third deflecting face 25 and the fourth deflecting face 26 on the first light beam 10 and the second light beam 20 may be seen in FIG. 4. In FIG. 4, the first light beam 10 is indicated by solid arrows and the second light beam 20 is indicated by dashed arrows. As an example, the first exit portion 12 is arranged opposite to the first incident portion 11, and the second exit portion 22 is arranged opposite to the second incident portion 21, as shown in FIGS. 1 to 3.

The light beam adjusting device 100 according to the embodiment of the present disclosure can perform a process on at least two kinds of light beams in combination. Through this light beam adjusting device 100, a part of the first light beam 10 may be emitted from the first light exit face 14, and another part thereof may be emitted from the second light exit face 24. Similarly, a part of the second light beam 20 may also be emitted from the first light exit face 14, and another part thereof may be emitted from the second light exit face 24. In this way, regardless of whether the first light beam 10 is turned on or the second light beam 20 is turned on, the light adjusted by the light beam adjusting device 100 can be simultaneously emitted from the first light exit face 14 and the second light exit face 24. Both the first light exit face 14 and the second light exit face 24 can be used to output light beams for different light functions. That is to say, the first light exit face 14 and the second light exit face 24 can be fully utilized regardless of which light function is intended to be realized. Compared to the solution in which different light beams are respectively emitted from light exit faces independent of each other (for example, the first light beam 10 can only be emitted from the first light exit face 14 and the second light beam 20 can only be emitted from the second light exit face 24), exit areas of the first light beam 10 and the second light beam 20 are enlarged. In contrast, if the exit area of each light beam remains constant, then the total area of the light exit faces and the space occupied by lamp structures may be reduced. The first light beam 10 and the second light beam 20 may be used to realize different light functions, for example, one may be used to realize a daytime running light function of a motor vehicle, while the other may be used to realize a turn indicator function of the motor vehicle.

The light beam adjusting device 100 according to the embodiment of the present disclosure may enable both the first light exiting surface 14 and the second light exiting surface 24 to emit light beams when only the first light beam 10 or the second light beam 20 is turned on, thereby light intensity distribution of the exit light beam in a lateral direction is substantially continuous. Such a design facilitates improving effect of the exit light beam (such as lighting effect or signaling effect).

In an example, the first light beam adjusting portion 13 may include at least one first aperture 17 having a first inner wall for forming the first deflecting face 15 and a second inner wall for forming the second deflecting face 16. Similarly, the second light beam adjusting portion 23 includes at least one second aperture 27 having a third inner wall for forming the third deflecting face 25 and a fourth inner wall for forming the fourth deflecting face 26. In the embodiment shown in FIGS. 1 to 3, the first light beam adjusting portion 13 includes a plurality of first apertures 17 arranged obliquely and the second light beam adjusting portion 23 includes a plurality of second apertures 27 arranged obliquely. The first apertures 17 and the second apertures 27 may have cross sections in a shape of a triangle (for example, a right triangle, or even an isosceles right triangle). However, this is not essential, for example, the first apertures 17 and the second apertures 27 may have other polygonal shapes as long as the first inner walls, the second inner walls, the third inner walls and the fourth inner walls can respectively act as the first deflecting faces 15, the second deflecting faces 16, the third deflecting faces 25 and the fourth deflecting faces 26. As an example, the first deflecting faces 15 may be in one-to-one correspondence with the fourth deflecting faces 26. The second deflecting faces 16 may also be in one-to-one correspondence with the third deflecting faces 25.

In an example, the first inner wall may be located on a side of the first aperture 17 facing towards the first incident portion 11 to facilitate the first deflecting face 15 to receive the first light beam 10 incident from the first incident portion 11. The second inner wall may be located on a side of the first aperture 17 facing towards the first exit portion 12 to facilitate the second deflecting face 16 to emit the deflected second light beam 20 towards the first exit portion 12. The third inner wall may be located on a side of the second aperture 27 facing towards the second incident portion 21 to facilitate the third deflecting face 25 to receive the second light beam 20 incident from the second incident portion 21. The fourth inner wall may be located on a side of the second aperture 27 facing towards the second exit portion 22 to facilitate the fourth deflecting face 26 to emit the deflected first light beam 10 towards the second exit portion 22.

As an example, the first deflecting face 15 and the fourth deflecting face 26 may be arranged to face towards each other, and the second deflecting face 16 and the third deflecting face 25 may be arranged to face towards each other. In the embodiment shown in FIGS. 1 to 3, the orientations of the first aperture 17 in the first light beam adjusting portion 13 and the second aperture 27 in the second light beam adjusting portion 23 adjacent to each other are opposite. In order to satisfy the positional correspondence between the first deflecting face 15 and the fourth deflecting face 26 and the positional correspondence between the second deflecting face 16 and the third deflecting face 25, the first aperture 17 in the first light beam adjusting portion 13 and the second aperture 27 in the second light beam adjusting portion 23 may be arranged in a staggered manner, as shown in FIG. 3.

In an embodiment, the first apertures 17 and the second apertures 27 may be through apertures. However, the embodiments of the present disclosure are not limited to those, for example, alternatively, the first apertures 17 and the second apertures 27 may be blind apertures.

In an example, the first light beam adjusting portion 13 may have a plurality of first deflecting faces 15 separated from each other and first light beam passages 18 along which another part of the first light beam 10 incident from the first incident portion 11 travel towards the first exit portion 12 are provided between the plurality of the first deflecting faces 15 separated from each other. The first light beam passages 18 and structures (for example, the first apertures 17) for forming the first deflecting faces 15 are alternately distributed, so that the part of the first light beam 10 that is directed towards the first light exit portion 12 and the part of the first light beam 10 that is deflected by the first deflecting faces 15 are distributed more uniformly. Similarly, the second light beam adjusting portion 23 may have a plurality of third deflecting faces 25 separated from each other and second light beam passages 28 along which another part of the second light beam 20 incident from the second incident portion 21 travel towards the second exit portion 22 are provided between the plurality of the third deflecting faces 25 separated from each other. Similarly, the second light beam passages 28 and structures (for example, the second apertures 27) for forming the third deflecting faces 25 are alternately distributed, so that the part of the second light beam 20 that is guided directly towards the second light exit portion 22 and the part of the third light beam 20 that is deflected by the third deflecting faces 25 are distributed more uniformly.

In an example, the first exit portion 12 may further include a first reflective face 31. The first reflective face 31 may be located between the first light beam adjusting portion 13 and the first light exit face 14 and arranged to reflect the part of the second light beam 20 deflected by the second deflecting face 16 and the another part of the first light beam 10 from the first incident portion 11 towards the first light exit face 14. Similarly, the second exit portion 22 may also include a second reflective face 32. The second reflective face 32 is located between the second light beam adjusting portion 23 and the second light exit face 24 and arranged to reflect the part of the first light beam 10 deflected by the fourth deflecting face 26 and the another part of the second light beam 20 from the second incident portion 21 towards the second light exit face 24. In the example shown in FIGS. 1 to 4, the first reflective face 31 and the second reflective face 32 are located in the same plane, which facilitates the manufacturing of the light beam adjusting device 100. However, the embodiments of the present disclosure are not limited to those, for example, the first reflective face 31 and the second reflective face 32 may alternatively be located in different planes respectively. As an example, some patterns (such as characters, stripes, and so on) may be formed on the first reflective face 31 and the second reflective face 32 depending on different light functions, so that the light beam emitted from the first light exit face 14 and the second light beam emitted from the second light exit face 24 have different patterns respectively.

As an example, the light beam adjusting device 100 may be a single piece, as shown in FIG. 1. Such a design facilitates simplifying manufacturing process of the light beam adjusting device 100. As an example, all of the first deflecting face 15, the second deflecting face 16, the third deflecting face 25, and the fourth deflecting face 26 may be total reflection faces. That is, these faces are oriented in such a way that incident angle of the first or second light beam thereon satisfies total reflection condition (greater than or equal to a total reflection critical angle). The total reflection critical angle is determined by refractive index of medium in the light beam adjusting device and refractive index of the surrounding environment medium (for example, air). This can improve optical efficiency. As an example, each one of the first deflecting face 15, the second deflecting face 16, the third deflecting face 25 and the fourth deflecting face 26 may be arranged at an angle of 45 degrees with respect to an optical axis direction x of the first light beam 10 that is incident on the one of the first deflecting face 15, the second deflecting face 16, the third deflecting face 25 and the fourth deflecting face 26. As an example, the light beam adjusting device 100 may be a light guide, for example, top surfaces and bottom surfaces of the first light beam adjusting portion 13 and the second light beam adjusting portion 23 are also total reflection faces.

In an example, the first incident portion 11 may be provided with a first collimator 19 arranged to collimate the first light beam 10, and the second incident portion 21 may be provided with a second collimator 29 arranged to collimate the second light beam 20. The first collimator 19 and the second collimator 29 may improve parallelism of the first light beam 10 and the second light beam 20 emitted into the light beam adjusting device 100, for example, a light beam emitted by a point light source may be collimated into an approximately parallel light beam. As an example, each of the first collimator 19 and the second collimator 29 may include a transmissive collimating portion 51 located at a central part of the collimator and a total reflection collimating portion 52 located a lateral part of the collimator. As shown in FIGS. 2 and 4, the transmissive collimating portion 51 may have a surface shape of for example a convex lens so that it can be used to collimate a central portion of the incident light beam. The total reflection collimating portion 52 can collimate a peripheral portion of the incident light beam through the total reflection face 53. This structure can improve optical coupling efficiency of the incident light beam. However, the first collimator 19 and the second collimator 29 in the embodiment of the present disclosure are not limited to the above embodiments, and other forms of collimators (such as collimating lenses) known in the art may also be employed.

Figure 5:
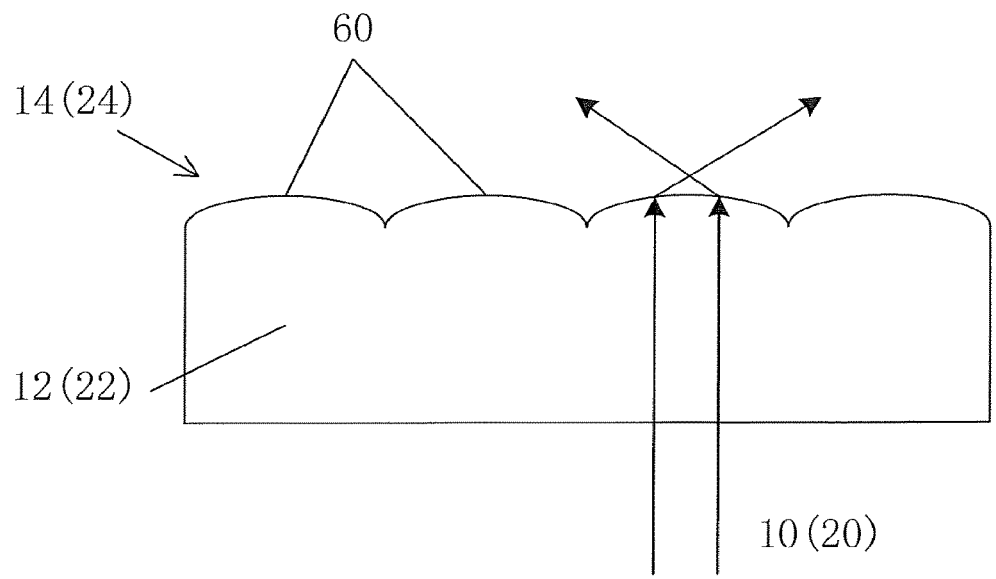
FIG. 5 is a schematic view of light distribution protrusions in a light beam adjusting device according to an embodiment of the present disclosure.

In an example, the first light exit face 14 and/or the second light exit face 24 are/is provided with a plurality of light distribution protrusions 60 (as shown in FIG. 5). The light distribution protrusions 60 are arranged to converge or disperse parts of the light beam passing through the light distribution protrusions 60 along a predetermined direction to adjust an intensity distribution of the light beam exiting from the first light exit face 14 and/or the second light exit face 24. By means of the first light exit face 14 and/or the second light exit face 24 provided with the plurality of light distribution protrusions 60, it can adjust the light intensity distribution of the exit light beam into a desired distribution. For example, the light intensity distribution may be made more uniform, and light intensity distributions at different distances from the first light exit face 14 and/or the second light exit face 24 may be adjusted to meet standards for the vehicle lamp of the motor vehicle (for example, Chinese national standards, EU standards, etc.). As an example, the surface shape of the light distribution protrusions 60 may be set in such a way that the light intensity distribution of the light beam emitted from the first light exit face 14 and/or the second light exit face 24 conforms to any one of the standards for the vehicle lamp of the motor vehicle.

FIG. 5 schematically shows effect of exemplary light distribution protrusions 60 on the light beam. The direction of travel of the light beam is schematically indicated by solid arrows. As an example, the surface shape of each light distribution protrusion 60 may be set to converge (for example, a concave surface) or disperse (for example, a convex surface) parts of the light beam passing through the light distribution protrusions 60 along a predetermined direction. It should be noted that, even though the surface shape of the light distribution protrusion 60 is configured to converge the light beam, the converged light beam may also become a dispersing light beam after passing through the convergence point due to the optical properties. Different surface shapes (for example, curving or oblique shape) of the light distribution protrusions 60 may change the light intensity distribution of the light beam at different distances from the first light exit face 14 and/or the second light exit face 24. For example, a relatively concentrated intensity in a cross section of the light beam within a certain distance from the first light exit face 14 and/or the second light exit face 24 may be made to meet desired illumination requirements. The specific parameters depend on design requirements of the vehicle lamps of different functions. The design requirements of the vehicle lamps having different functions may refer to relevant technical specifications in the related art, which will not be described herein. The convergence effect or dispersion effect of the light distribution protrusions 60 on the parts of the light beam may be achieved by refracting the parts of the light beam by the surfaces of the light distribution protrusions 60.

As an example, the first deflecting face 15 and the second deflecting face 16 may be perpendicular to each other, and the third deflecting face 25 and the fourth deflecting face 26 may be perpendicular to each other.

The light beam adjusting device 100 may include only one first adjusting unit 1 and only one second adjusting unit 2. However, in an example, the light beam adjusting device 100 may also include a plurality of the first adjusting units 1 and a plurality of the second adjusting units 2 arranged side by side to alternate with each other, as shown in FIGS. 1 to 3. In this way, it is easy to obtain a more compact structure and an elongated shape.

An embodiment of the present disclosure further provides a vehicle lamp. The vehicle lamp may include a first light source 61 arranged to emit a first light beam 10, a second light source 62 arranged to emit a second light beam 20, and the light beam adjusting device 100 according to any one of the above embodiments.

As an example, one of the first light beam 10 and the second light beam 20 is used for a daylight running light and the other is used for a turn indicator. However, the embodiments of the present disclosure are not limited to this, and the first light beam 10 and the second light beam 20 may also be used for other functional lights of the motor vehicle, for example, a central high-mount stop lamp, a position light, a tail brake light, and the like.

In an example, one of the first light source 61 and the second light source 62 includes a light emitting diode with a first color, and the other includes a light emitting diode with a second color different from the first color. This allows the light lamp to realize a bi-color illumination function. For example, one of the first light source 61 and the second light source 62 may include a white light emitting diode, and the other includes a monochromatic light emitting diode (for example, a yellow light emitting diode or the like). Such a combination of light emitting diodes can improve the lighting effect of the vehicle lamp. As an example, each of the first light source 61 and the second light source 62 may include one light emitting diode, or alternatively, it may include a plurality of light emitting diodes (for example, an array of light emitting diodes). In an embodiment of the present disclosure, the first light source 61 and the second light source 62 are not limited to the form of light emitting diode, instead, they may be any other type of known light sources. In an embodiment of the present disclosure, the first light source 61 and the second light source 62 may operate simultaneously or separately.

Figure 6:
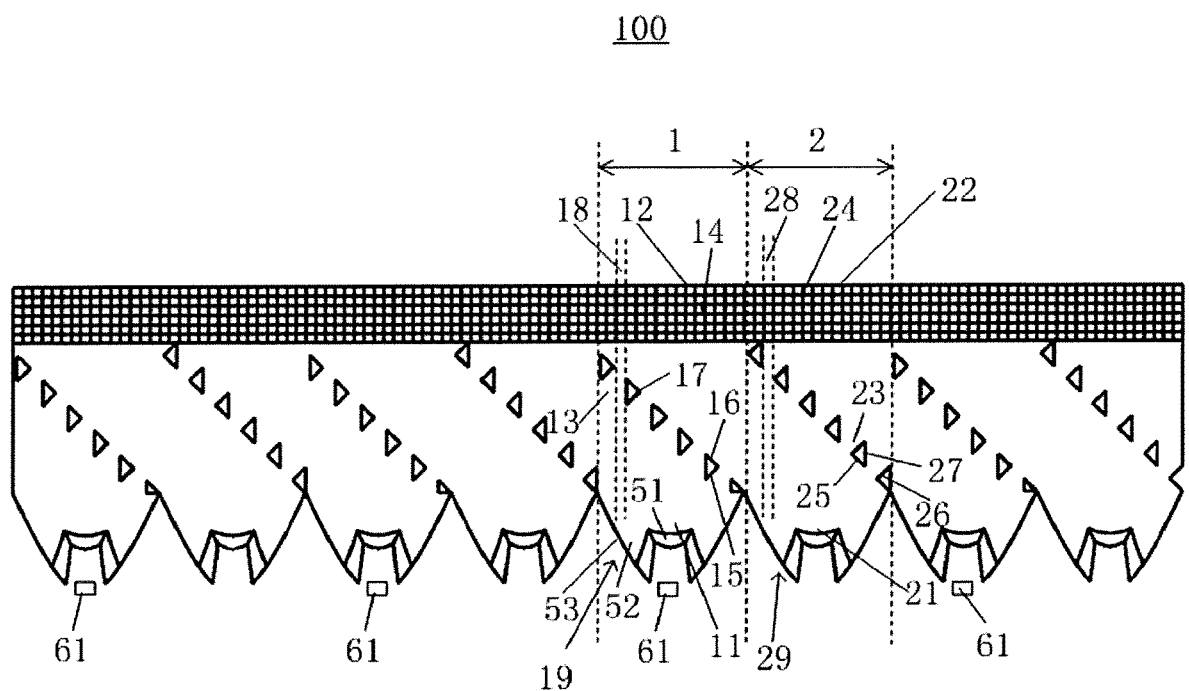
FIG. 6 shows an example of a light source arrangement of a vehicle lamp according to an embodiment of the present disclosure.

An embodiment of the present disclosure further provides a vehicle lamp including: only one of a first light source 61 arranged to emit a first light beam 10 and a second light source 62 arranged to emit a second light beam 20; and the light beam adjusting device 100 according to any one of the above embodiments. As shown in FIG. 6, the vehicle lamp includes only the first light source 61, but it does not include the second light source 62. In this case, by means of the light beam adjusting device 100, the vehicle lamp can only use substantially half of the light sources to illuminate both the first light exit face 14 and the second light exit face 24. The vehicle lamp according to the embodiment of the present disclosure can save the number of the light sources and improve lateral continuity of the exit light beam, compared to the case where the first light source 61 can only illuminate the light exit face directly located in front of it. Of course, the embodiments of the present disclosure are not limited to the example of FIG. 6, for example, the vehicle lamp may include only the second light source 62, and it does not include the first light source 61.

An embodiment of the present disclosure further provides a motor vehicle including the light beam adjusting device according to any one of the above embodiments or the vehicle lamp according to any one the above embodiments.

Although the principles of the present disclosure have been described above by taking two kinds of light beams as an example, it should be understood that the embodiments of the present disclosure are not limited thereto, for example, more kinds of light beams and more kinds of light sources can be used, but the specific details of these solutions will not be described herein.

In an embodiment of the present disclosure, the light beam adjusting device 100 may be made of a glass material, a resin material or a plastic material which is at least partially transparent, such as PMMA (polymethyl methacrylate), polycarbonate, and the like.

In an embodiment of the present disclosure, the light beam adjusting device 100 may be supported or suspended by any suitable means for holding an optical element, such as a support seat, a suspension arm, and the like.

While the present disclosure has been described in connection with the accompanying drawings, embodiments disclosed in the drawings are intended to illustrate the exemplified embodiments of the disclosure and are not to be construed as limiting the present disclosure. The scales in the drawings are merely illustrative and are not to be construed as limiting the present disclosure. The bracket in the reference numeral indicates that the feature indicated by the reference numeral before the bracket and the feature indicated by the reference numeral in the bracket are coincident in the drawings.

While some embodiments of the general inventive concept of present disclosure have been shown and described, those skilled in the art will appreciate that changes may be made to these embodiments without departing from the principles and spirit of the general inventive concept of the present disclosure. The scope of the present disclosure is defined by the appended claims and their equivalents.

What is claimed is:

1. A light beam adjusting device, comprising:
   a first adjusting unit and a second adjusting unit arranged side by side;
   wherein the first adjusting unit comprises:
   a first incident portion arranged to receive a first light beam;
   a first exit portion having a first light exit face; and
   a first light beam adjusting portion located between the first incident portion and the first exit portion in a first direction and having at least one first deflecting face and at least one second deflecting face; and
   wherein the second adjusting unit comprises:
   a second incident portion arranged to receive a second light beam;
   a second exit portion having a second light exit face; and
   a second light beam adjusting portion located between the second incident portion and the second exit portion in the first direction and having at least one third deflecting face and at least one fourth deflecting face, wherein the first deflecting face is arranged to deflect a part of the first light beam towards the fourth deflecting face primarily in a second direction perpendicular to the first direction, and the third deflecting face is arranged to deflect a part of the second light beam towards the second deflecting face primarily in a third direction opposite to and parallel with the second direction, and the fourth deflecting face is arranged to deflect the part of the first light beam deflected by the first deflecting face towards the second exit portion to cause the part of the first light beam to be emitted from the second light exit face, and the second deflecting face is arranged to deflect the part of the second light beam deflected by the third deflecting face towards the first exit portion to cause the part of the second light beam to be emitted from the first light exit face.

2. The light beam adjusting device according to claim 1, wherein the first light beam adjusting portion comprises at least one first aperture having a first inner wall for forming the first deflecting face and a second inner wall for forming the second deflecting face; and the second light beam adjusting portion comprises at least one second aperture having a third inner wall for forming the third deflecting face and a fourth inner wall for forming the fourth deflecting face.

3. The light beam adjusting device according to claim 2, wherein the first inner wall is located on a side of the first aperture facing towards the first incident portion, the second inner wall is located on a side of the first aperture facing towards the first exit portion, the third inner wall is located on a side of the second aperture facing towards the second incident portion, the fourth inner wall is located on a side of the second aperture facing towards the second exit portion.

4. The light beam adjusting device according to claim 2, wherein the first deflecting face and the fourth deflecting face are arranged to face towards each other and the second deflecting face and the third deflecting face are arranged to face towards each other.

5. The light beam adjusting device according to claim 2, wherein the first aperture and the second aperture are through apertures.

6. The light beam adjusting device according to claim 2, wherein the first aperture and the second aperture have cross sections in a shape of a right triangle.

7. The light beam adjusting device according to claim 1, wherein the first light beam adjusting portion has a plurality of first deflecting faces separated from each other and a first light beam passage along which another part of the first light beam incident from the first incident portion travels towards the first exit portion, the first light beam passage is provided between the plurality of the first deflecting faces separated from each other; and wherein the second light beam adjusting portion has a plurality of third deflecting faces separated from each other and a second light beam passage along which another part of the second light beam incident from the second incident portion travels towards the second exit portion, the second light beam passage is provided between the plurality of the third deflecting faces separated from each other.

8. The light beam adjusting device according to claim 7, wherein the first exit portion is arranged opposite to the first incident portion and further comprises a first reflective face, which is located between the first light beam adjusting portion and the first light exit face and is arranged to reflect the part of the second light beam deflected by the second deflecting face and the another part of the first light beam from the first incident portion towards the first light exit face; and wherein the second exit portion is arranged opposite to the second incident portion and further comprises a second reflective face, which is located between the second light beam adjusting portion and the second light exit face and is arranged to reflect the part of the first light beam deflected by the fourth deflecting face and the another part of the second light beam from the second incident portion towards the second light exit face.

9. The light beam adjusting device according to claim 1, wherein the light beam adjusting device is a single piece.

10. The light beam adjusting device according to claim 1, wherein all of the first deflecting face, the second deflecting face, the third deflecting face and the fourth deflecting face are total reflection faces.

11. The light beam adjusting device according to claim 1, wherein the first incident portion is provided with a first collimator arranged to collimate the first light beam and the second incident portion is provided with a second collimator arranged to collimate the second light beam.

12. The light beam adjusting device according to claim 1, wherein the first light exit face and/or the second light exit face are/is provided with a plurality of light distribution protrusions, wherein the light distribution protrusions are arranged to converge or disperse parts of a light beam passing through the light distribution protrusions along a predetermined direction to adjust an intensity distribution of the light beam exiting from the first light exit face and/or the second light exit face.

13. The light beam adjusting device according to claim 1, wherein the light beam adjusting device comprises plural ones of the first adjusting unit and plural ones of the second adjusting unit arranged side by side to alternate with each other.

14. A vehicle lamp comprising:
at least one first light source arranged to emit a first light beam;
at least one second light source arranged to emit a second light beam; and
the light beam adjusting device according to claim 1.

15. The vehicle lamp according to claim 14, wherein one of the first light beam and the second light beam is used for a daylight running light and the other is used for a turn indicator.

16. The vehicle lamp according to claim 14, wherein one of the first light source and the second light source comprises a light emitting diode with a first color and the other comprises a light emitting diode with a second color different from the first color.

17. A vehicle lamp comprising:
only one light source arranged to emit a first light beam and no light source arranged to emit a second light beam; and
the light beam adjusting device according to claim 1, wherein
the second incident portion does not receive the second light beam.

18. A motor vehicle comprising the light beam adjusting device according to claim 1.

19. A motor vehicle comprising the vehicle lamp according to claim 14.

20. The light beam adjusting device according to claim 2, wherein the first light beam adjusting portion has a plurality of first deflecting faces separated from each other and a first light beam passage along which another part of the first light beam incident from the first incident portion travels towards the first exit portion, the first light beam passage is provided between the plurality of the first deflecting faces separated from each other; and wherein the second light beam adjusting portion has a plurality of third deflecting faces separated from each other and a second light beam passage along which another part of the second light beam incident from the second incident portion travels towards the second exit portion, the second light beam passage is provided between the plurality of the third deflecting faces separated from each other.

* * * * *